United States Patent
Miyazaki

(10) Patent No.: US 11,226,911 B2
(45) Date of Patent: Jan. 18, 2022

(54) PROGRAMMABLE LOGIC CONTROLLER, CPU UNIT, FUNCTION UNIT, METHOD, AND PROGRAM

(71) Applicant: Mitsubishi Electric Corporation, Tokyo (JP)

(72) Inventor: Takahiro Miyazaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/252,285

(22) PCT Filed: Aug. 22, 2018

(86) PCT No.: PCT/JP2018/031008
§ 371 (c)(1),
(2) Date: Dec. 15, 2020

(87) PCT Pub. No.: WO2020/039523
PCT Pub. Date: Feb. 27, 2020

(65) Prior Publication Data
US 2021/0255974 A1 Aug. 19, 2021

(51) Int. Cl.
*G01K 3/00* (2006.01)
*G06F 13/20* (2006.01)

(52) U.S. Cl.
CPC .............. *G06F 13/20* (2013.01); *G01K 3/005* (2013.01)

(58) Field of Classification Search
None
See application file for complete search history.

(56) References Cited

U.S. PATENT DOCUMENTS

| | | | | |
|---|---|---|---|---|
| 8,266,921 | B2 * | 9/2012 | Tashiro | H05K 7/20745 62/259.2 |
| 9,152,473 | B2 * | 10/2015 | Hermerding, II | G06F 1/3234 |
| 9,563,580 | B2 * | 2/2017 | Warner | G06F 13/4282 |
| 2008/0189075 | A1 * | 8/2008 | Rodriquez | G06F 11/263 702/183 |

(Continued)

FOREIGN PATENT DOCUMENTS

| | | |
|---|---|---|
| JP | 10-254512 A | 9/1998 |
| JP | 2000-298782 A | 10/2000 |

(Continued)

OTHER PUBLICATIONS

International Search Report and Written Opinion dated Sep. 18, 2018, received for PCT Application No. PCT/JP2018/031008, Filed on Aug. 22, 2018, 8 pages including English Translation.

(Continued)

*Primary Examiner* — Elias Mamo
(74) *Attorney, Agent, or Firm* — Xsensus LLP

(57) ABSTRACT

A temperature detector (201) of an input unit (200) acquires a temperature of the input unit (200). A temperature detector (301) of an output unit (300) acquires a temperature of the output unit (300). When the temperature of the input unit (200) or the output unit (300) satisfies a preset condition, an input/output manager (101) of the CPU unit (100) controls passage/blockage of a signal from the detector (901) to the input unit (200) or a signal from the output unit (300) to a control target device (902) in accordance with preset content of signal input/output restriction.

10 Claims, 12 Drawing Sheets

(56) References Cited

U.S. PATENT DOCUMENTS

| | | | |
|---|---|---|---|
| 2012/0216065 A1* | 8/2012 | Nastacio | H05K 7/20836 |
| | | | 713/340 |
| 2014/0188302 A1* | 7/2014 | Srinivasan | G05D 23/19 |
| | | | 700/299 |
| 2016/0238308 A1 | 8/2016 | Uchida et al. | |
| 2017/0322607 A1 | 11/2017 | Kawana | |

FOREIGN PATENT DOCUMENTS

| | | |
|---|---|---|
| JP | 2007-199782 A | 8/2007 |
| JP | 2008-226004 A | 9/2008 |
| JP | 2011-248578 A | 12/2011 |
| JP | 2013-205878 A | 10/2013 |
| TW | 201428469 A | 7/2014 |
| TW | 201516359 A | 5/2015 |
| WO | 2016/088228 A1 | 6/2016 |

OTHER PUBLICATIONS

Office Action dated Feb. 5, 2020, received for TW Application No. 108125001, 12 pages including English Translation.
Notice of Reasons for Refusal dated Apr. 23, 2019, received for JP Application 2019-508991, 4 pages including English Translation.
Decision to Grant dated Aug. 27, 2019, received for JP Application 2019-508991, 5 pages including English Translation.

* cited by examiner

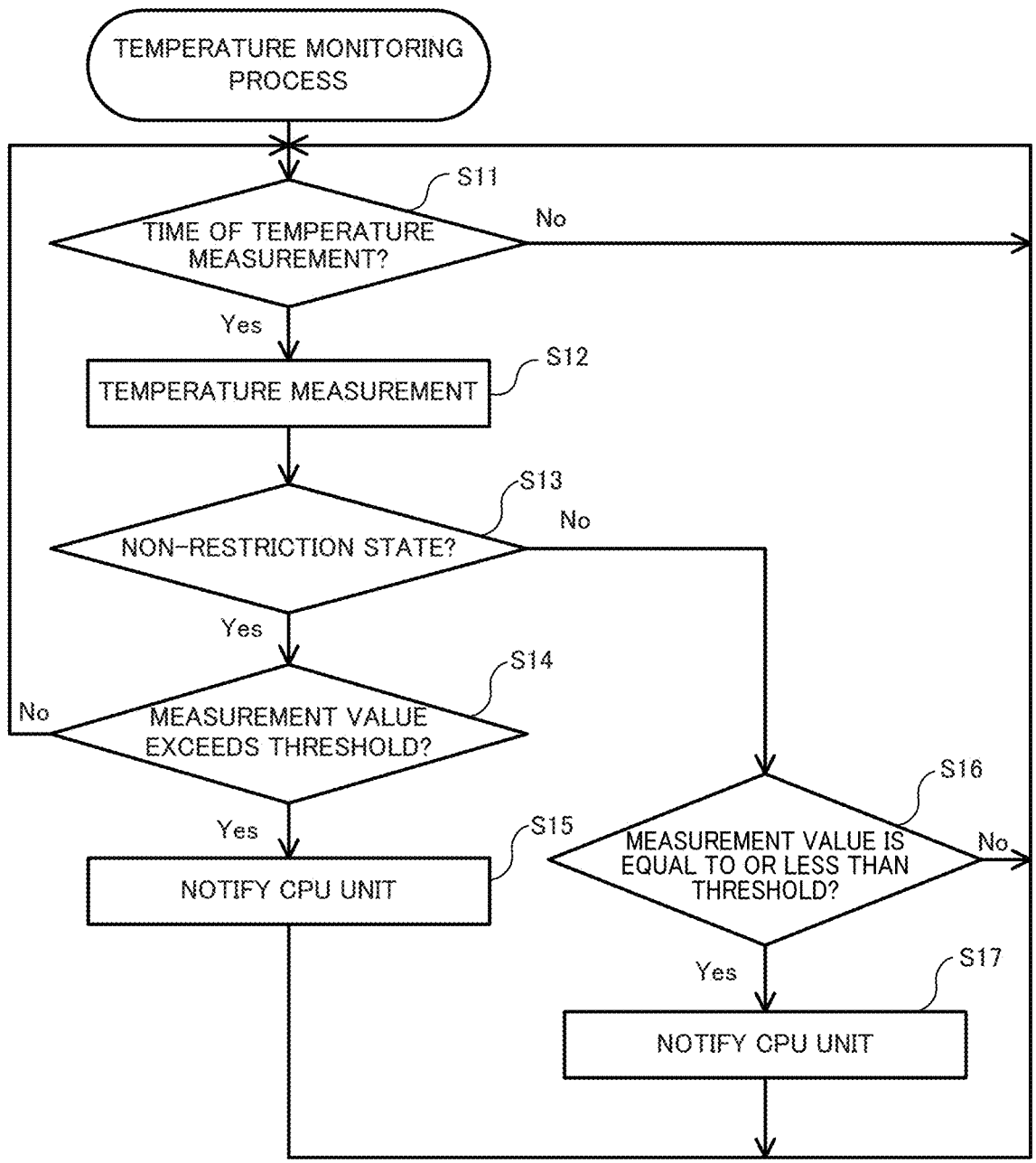

PROGRAMMABLE LOGIC CONTROLLER, CPU UNIT, FUNCTION UNIT, METHOD, AND PROGRAM

CROSS-REFERENCE TO RELATED APPLICATION

The present application is based on PCT filing PCT/JP2018/031008, filed Aug. 22, 2018, the entire contents of which are incorporated herein by reference.

TECHNICAL FIELD

The present disclosure relates to a programmable logic controller, a CPU unit, a function unit, a method, and a program.

BACKGROUND ART

A programmable logic controller includes a plurality of units including a central processing unit (CPU) unit that performs an operation using an input signal from a detection device and outputs an output signal for control of a device to be controlled, an input unit that inputs to the CPU unit the input signal from the detection device, an output unit that outputs the output signal of the CPU unit to the device to be controlled, and the like.

An input signal circuit of the input unit detects a signal, indicating ON/OFF, received from the detection device. However, a temperature of an input element increases due to factors including frequent turning-on of the input element and a prolonged ON period of the input element. As a result, a temperature in the input unit becomes high, which may cause malfunction of operation of the input unit or failure of an electronic part in the input unit.

An output signal circuit of the output unit outputs a signal indicating ON/OFF for a control target device. However, a temperature of an output element increases due to factors such as frequent turning-on of the output element and a prolonged ON period of the output element. As a result, a temperature in the output element becomes high, which may cause malfunction of operation of the output unit or failure of an electronic part inside the output unit.

To avoid such circumstances, Patent Literature 1 mentions determination of an average of ratios of input/output points that turn on simultaneously relative to a total number of input/output points, and notification of an abnormality when the average exceeds a threshold indicating an allowable ON state.

CITATION LIST

Patent Literature

Patent Literature 1: Unexamined Japanese Patent Application Publication No. 2013-205878

SUMMARY OF INVENTION

Technical Problem

In the configuration disclosed in Patent Literature 1, notification of occurrence of the abnormality is made when an internal temperature increases, but the programmable logic controller continuously operates even while making the abnormality notification. Thus, for example, delay in the time when a user notices the abnormality notification may cause breakdown of the unit, which may greatly affect operations of a production line, a control system, and the like.

Moreover, conventionally the supply of power to the input unit and the output unit is limited in accordance with the temperature in the unit. However, in a case where the power supplied to the input unit and the output unit is limited and the input unit and the output unit are operated at power less than a rated value, a malfunction is assumed to occur. For example, the input unit may supply to the CPU unit an input signal unconverted to a necessary signal level due to limitation of the supplied power. In this case, the CPU unit is assumed not to be able to properly identify an input value from the supplied input signal. In addition, the output unit cannot convert the output signal to a necessary signal level, and the output device supplied with the output signal is assumed not to operate normally.

Here, devices to be controlled by the programmable logic controller may include a device for which input/output restriction is not desirable. For example, restriction of an input indicating that an emergency stop button is pushed is undesirable from a safety hazard perspective. A normal operation in such an input/output case is to be guaranteed.

In view of the above circumstances, an objective of the present disclosure is to prevent failure due to rise in temperature of a unit while guaranteeing an input/output related operation that is not to be restricted.

Solution to Problem

To achieve the above objective, a programmable logic controller of the present disclosure includes a CPU unit and a function unit that includes at least one of an input function of inputting to the CPU unit a signal supplied from an external device or an output function of outputting to the external device a signal supplied from the CPU unit. Acquisition means acquires a temperature of the function unit. Control means controls, when the temperature of the function unit satisfies a preset condition, passage and blockage of the signal from the external device to the function unit or the signal from the function unit to the external device in accordance with preset content of signal input/output restriction.

Advantageous Effects of Invention

The programmable logic controller of the present disclosure controls, when the temperature of the function unit satisfies the preset condition, passage and blockage of the signal from the external device or the signal from the function unit to the external device in accordance with the preset content of the signal input/output restriction. Such configuration can prevent failure of the unit without stoppage of input and output for an input/output signal that is not to be restricted.

BRIEF DESCRIPTION OF DRAWINGS

FIG. 5 is a flowchart of a temperature monitoring process of input/output units according to the embodiment;

DESCRIPTION OF EMBODIMENTS

A programmable logic controller 1 according to an embodiment of the present disclosure is described hereinafter in detail with reference to the drawings.

Embodiment

Figure 1:
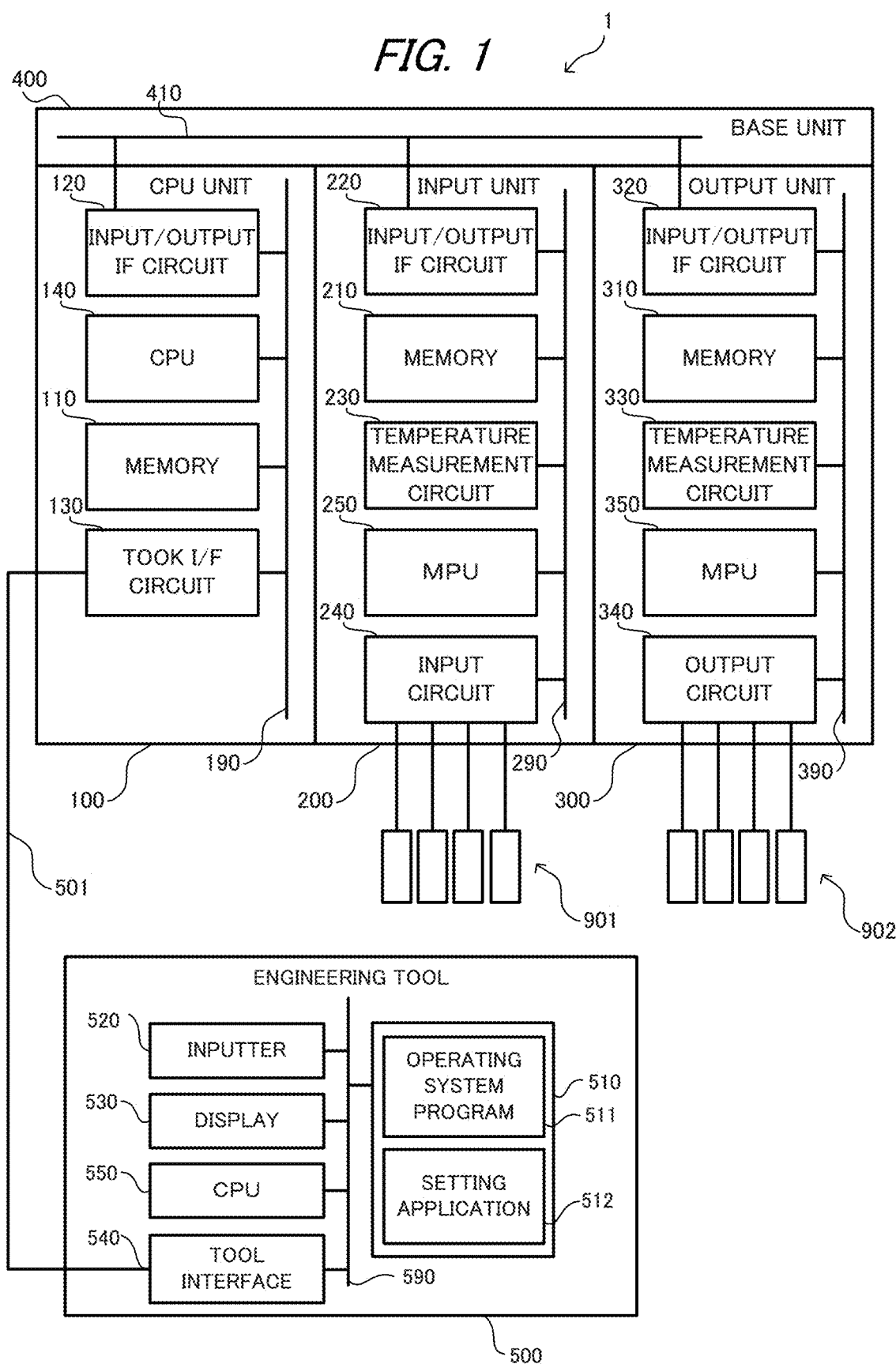
FIG. 1 is a block diagram illustrating a hardware configuration of a programmable logic controller and an engineering tool according to an embodiment.

As illustrated in FIG. 1, the programmable logic controller 1 includes a central processing unit (CPU) unit 100 that controls the overall programmable logic controller 1, an input unit 200 that inputs to the CPU unit 100 a signal supplied from a detector 901, and an output unit 300 that outputs to a control target device 902 a signal supplied from the CPU unit 100. The programmable logic controller 1 controls the detector 901 and the control target device 902 that operate in, for example, a production system, a control system, or the like. A signal supplied from the detector 901 to the input unit 200 may be hereinafter referred to as an input signal. A signal supplied from the CPU unit 100 to the output unit 300 may be hereinafter referred to as an output signal. The input signal and the output signal may be collectively referred to as input/output signals. The CPU unit 100 is an example of the CPU unit of the present disclosure. The input unit 200 and the output unit 300 are examples of the function unit of the present disclosure. The detector 901 and the control target device 902 are examples of the external device of the present disclosure.

The programmable logic controller 1 monitors temperatures in units that are the input unit 200 and the output unit 300 having input/output functions, and performs input/output restriction when a temperature in the unit exceeds a set threshold. Here, input/output restriction includes meanings of blocking input of a signal from the detector 901 to the input unit 200 and blocking output of a signal from the output unit 300 to a non-control target 902. However, the programmable logic controller 1 performs control so as not to impose restriction for preset input/output signals, that is, not to block the signals.

The detector 901 including a sensor, a switch, and the like is connected to the input unit 200. The input unit 200 converts the input signal received from the detector 901 and indicating ON/OFF to a determined signal level, and supplies the converted input signal to the CPU unit 100.

The CPU unit 100 executes each instruction of a program in accordance with ON/OFF of the input signal supplied from the input unit 200 to perform a sequence of operations such as series/parallel connection of a contact, and outputs to the output unit 300 as the output signal an operation result represented by ON/OFF.

The control target device 902 including an actuator, solenoid valve, an indicator lamp, and the like is connected to the output unit 300. The output unit 300 converts, to a determined signal level, the output signal received from the CPU unit 100 and indicating ON/OFF, and supplies the converted output signal to the control target device 902.

For example, the CPU unit 100 supplies to the output unit 300 an ON signal as an instruction to drive an actuator of the control target device 902 and an OFF signal as an instruction to stop the actuator.

The CPU unit 100, the input unit 200, and the output unit 300 are connected to an unillustrated power supply unit via a base unit 400 and operate with power supplied from the power supply unit. The CPU unit 100, the input unit 200, and the output unit 300 are also connected via a shared bus 410 and communicate with one another via the shared bus 410.

As illustrated in FIG. 1, the CPU unit 100 includes, as a hardware configuration, a memory 110 that stores various kinds of programs and data, an input/output interface (I/F) circuit 120 that communicates with the input unit 200 and the output unit 300, a tool I/F circuit 130 for communication with an engineering tool 500 described later, and a CPU 140 that controls the whole CPU unit 100. The memory 110, the input/output I/F circuit 120, the tool I/F circuit 130 are each connected via a bus 190 to the CPU 140 and communicate with the CPU 140.

The memory 110 includes a volatile memory and a non-volatile memory, and stores various kinds of programs and parameters necessary for execution of the programs. The memory 110 is used as a working memory of the CPU 140.

The input/output I/F circuit 120 converts, to an electrical signal, the data supplied from the CPU 140, and sends the converted signal via the shared bus 410 to the input unit 200 and the output unit 300. The input/output I/F circuit 120 returns to data the electrical signal received from the input unit 200 and the output unit 300 and outputs the data to the CPU 140.

The tool I/F circuit 130 is an interface for the CPU unit 100 to communicate with the engineering tool 500 described later.

The CPU 140 is a computing device and executes various kinds of programs stored in the memory 110 to implement various kinds of functions of the CPU unit 100.

The input unit 200 includes, as a hardware configuration, a memory 210 that stores various kinds of data, an input/output I/F circuit 220 that communicates with the CPU unit 100, a temperature measurement circuit 230 that measures a temperature in the input unit 200, an input circuit 240 that receives a signal from the detector 901, and a micro processing unit (MPU) 250 that controls the whole unit 200. The memory 210, the input/output I/F circuit 220, the temperature measurement circuit 230, and the input circuit 240 are connected via a bus 290 to the MPU 250 and communicate with the MPU 250.

The memory 210 includes a volatile memory and a non-volatile memory, and stores various kinds of programs to implement functions of the input unit 200. The memory 210 includes a shared memory accessible by the CPU unit 100.

The input/output I/F circuit 220 converts, to an electrical signal, the data supplied from the MPU 250, and returns to data the electrical signal received from the CPU unit 100 and outputs the data to the MPU 250.

The temperature measurement circuit 230 includes one or more temperature detection elements disposed in the input unit 200, and measures a temperature in the input unit 200 and outputs the measurement value to the MPU 250.

The input circuit 240 is connected to an unillustrated input terminal of the input unit 200. The input terminal is connected to an unillustrated output terminal of the detector 901 via wiring. The input circuit 240 converts, to a determined signal level, the input signal supplied from the detector 901, and outputs the converted input signal to the MPU 250. The input circuit 240 includes a switching element that switches between conduction and shut-off of the electrical signal. When the switching element of the input circuit 240 is turned off, the input circuit 240 and the input terminal are in a shut-off state. As a result, the input unit 200 and the detector 901 are not in electrical communication with each other and a signal is not input from the detector 901 to the input unit 200. By contrast, when the switching element of the input circuit 240 is turned on, the input circuit 240 and the input terminal are in a conducting state. As a result, the input unit 200 and the detector 901 are in electrical communication with each other, and a signal is input from the detector 901 to the input unit 200.

The MPU 250 is a computing device and executes various kinds of programs stored in the memory 210 to implement various kinds of functions of the input unit 200. The MPU 250 sends, to the CPU unit 100 via the input/output I/F circuit 220, data supplied from the temperature measurement circuit 230 and indicating a temperature in the input unit 200. The MPU 250 sends, to the CPU unit 100 via the input/output I/F circuit 220, the input signal of the detector 901 supplied from the input circuit 240.

The output unit 300 includes, as a hardware configuration, a memory 310 that stores various kinds of data, an input/output I/F circuit 320 that communicates with the CPU unit 100, a temperature measurement circuit 330 that measures a temperature in the output unit 300, an output circuit 340 that outputs a control signal to the control target device 902, and an MPU 350 that controls the whole output unit 300. The memory 310, the input/output I/F circuit 320, the temperature measurement circuit 330, and the output circuit 340 are each connected via a bus 390 to the MPU 350 and communicate with the MPU 350.

The memory 310 includes a volatile memory and a non-volatile memory, and stores a program for implementing a function of the output unit 300. The memory 310 includes a shared memory accessible by the CPU unit 100.

The input/output I/F circuit 320 converts, to an electrical signal, the data supplied from the MPU 350 and returns to data the electrical signal received from the CPU unit 100 to and output the data to the MPU 350.

The temperature measurement circuit 330 includes one or more temperature detection elements disposed in the output unit 300, and measures a temperature in the output unit 300 and outputs the measurement value to the MPU 350.

The output circuit 340 is connected to an unillustrated output terminal of the output unit 300. The output terminal is connected to an unillustrated input terminal of the control target device 902 via wiring. The output circuit 340 converts, to a determined signal level, the output signal supplied from the MPU 350 and outputs the converted output signal to the control target device 902. The output circuit 340 includes a switching element that switches between conduction and shut-off of the electrical signal. When the switching element of the output circuit 340 is turned off, the output circuit 340 and the output terminal are in a shut-off state. As a result, the output unit 300 and the control target device 902 are not in electrical communication with each other and a signal is not output from the output unit 300 to the control target device 902. By contrast, when the switching element of the output circuit 340 is turned on, the output circuit 340 and the output terminal are in a conducting state. As a result, the output unit 300 and the control target device 902 are in electrical communication with each other, and a signal is output from the output unit 300 to the control target device 902.

The MPU 350 is a computing device and executes various kinds of programs stored in the memory 310 to implement various kinds of functions of the output unit 300. The MPU 350 sends, to the CPU unit 100 via the input/output I/F circuit 320, the data supplied from the temperature measurement circuit 330 and indicating a temperature in the output unit 300. The MPU 350 outputs to the output circuit 340 the output signal supplied from the CPU unit 100 to be sent to the control target device 902.

Hereinafter, the input terminal of the input unit 200 to which the input signal is input may be referred to as an input point, and the output terminal of the output unit 300 from which the output signal is output may be referred to as an output point. The input point and the output point may be collectively referred to as input/output points.

The engineering tool 500 is a device formed by a personal computer in which an application for setting about input/output restriction of the input unit 200 or the output unit 300 is installed. The engineering tool 500 includes a storage 510 that stores various kinds of data, an inputter 520 that detects an input operation of a user, a display 530 that displays an image on a display device, a tool interface 540 for communication with the CPU unit 100, and a CPU 550 that controls the whole engineering tool 500. Each part of the engineering tool is connected to one another via a bus 590.

The storage 510 includes an operating system program 511 and a setting application 512. The operating system program 511 is a program for controlling the whole engineering tool 500. The setting application 512 is a program for setting with respect to input/output restriction of the input unit 200 and the output unit 300.

In setting of the input/output restriction, the storage 510 stores data relating to a configuration of the programmable logic controller 1 to be used. This data includes, for example, information specifying each unit included in the programmable logic controller 1. The storage 510 also stores data specifying input/output points of each unit. This data includes, for example, information for identifying each input point, for how many input points the input unit 200 has, and the like.

The inputter 520 includes an input device such as a keyboard and/or a mouse, and receives an operation input from a user, and outputs to the CPU 550 a signal based on the received operation. The display 530 includes an image display device, and outputs an image on a screen of the image display device in accordance with control of the CPU 550.

The tool interface 540 receives and sends data from and to the CPU unit 100 connected via a communication cable 501 in accordance with control of the CPU 550.

The CPU 550 executes the operating system program 511 to activate the operating system and control the whole engineering tool 500. The CPU 550 executes the setting application 512 on the operating system to implement a function of setting of the input/output restriction.

Figure 2:
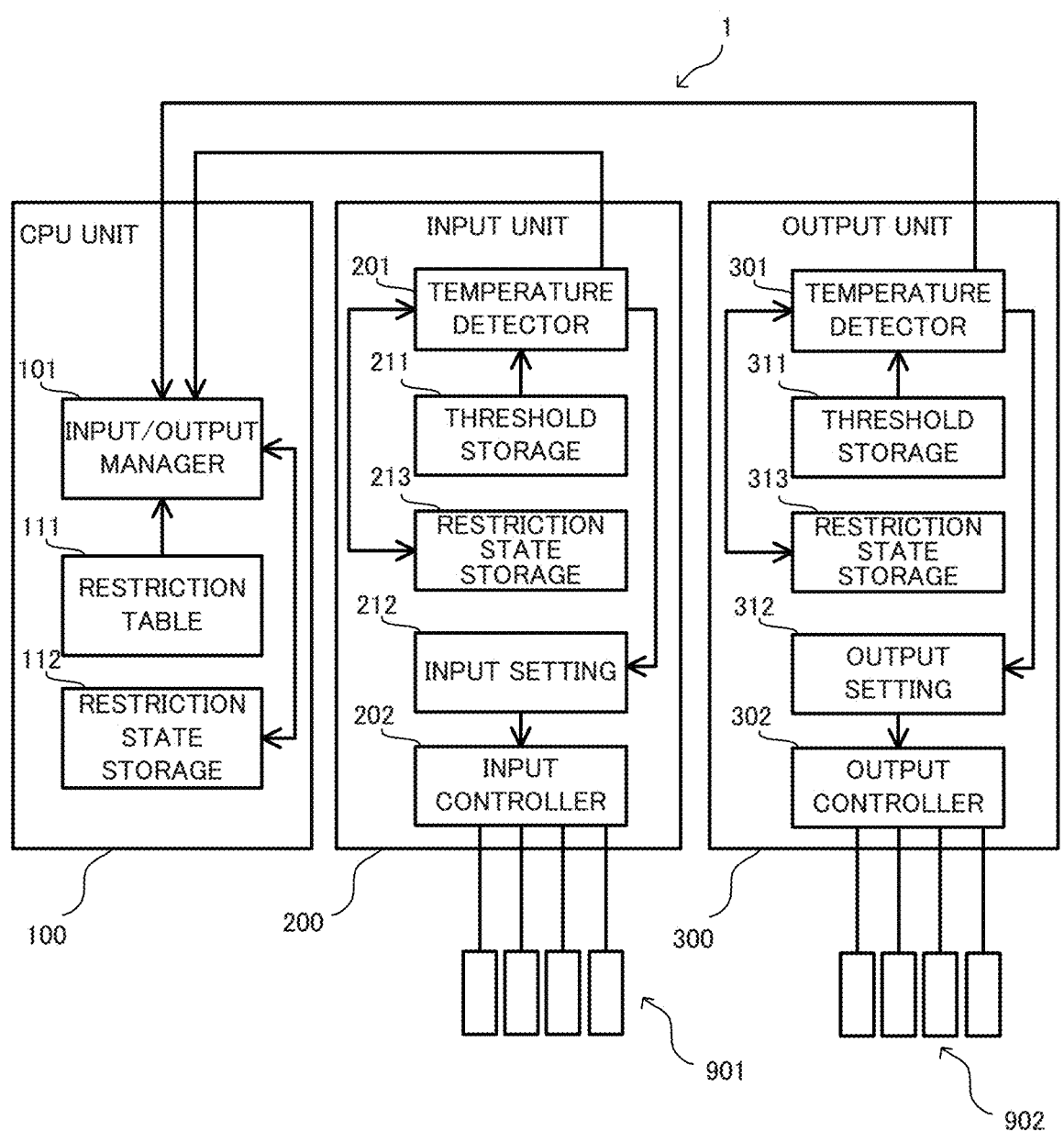
FIG. 2 is a block diagram illustrating a functional configuration of the programmable logic controller according to the embodiment.

Next, a functional configuration of the CPU unit 100, the input unit 200, and the output unit 300 is described with reference to FIG. 2.

The CPU unit 100 functionally includes an input/output manager 101 that manages input/output of each of the input unit 200 and the output unit 300, a restriction table 111 that specifies passage/blockage of a signal of each input/output when the input/output of the input unit 200 and the output unit 300 is restricted, and a restriction state storage 112 that stores a value indicating a state of input/output restriction for each of the input unit 200 and the output unit 300. The input/output manager 101 is an example of control means of the present disclosure.

Figure 3:
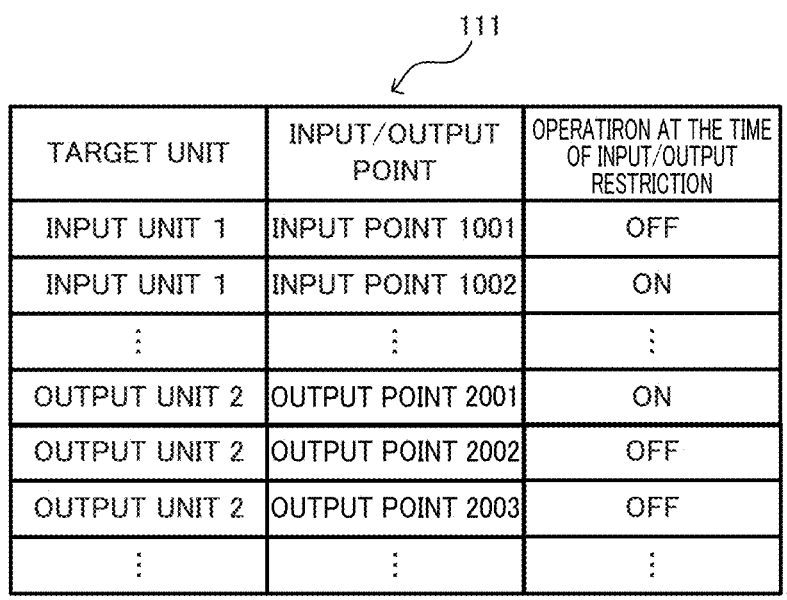
FIG. 3 is a diagram illustrating an example of data registered in a restriction table according to the embodiment.

The restriction table 111 stores information indicating which input/output point, among the input/output points of the input unit 200 and the output unit 300, is restricted when the input/output is restricted. For the input point for which the restriction table 111 specifies that input is restricted, the input unit 200 blocks the input signal from the detector 901. For the output point for which the restriction table 111 specifies that output is restricted, the output unit 300 blocks the output signal to the control target device 902. As illustrated in FIG. 3, the restriction table 111 stores information indicating a target unit, information for identification of the input/output points, and information indicating whether or not the input/output point is blocked during the input/output restriction. In the illustrated example, the term "OFF" means that the input signal or the output signal is blocked. The term "ON" means that the input signal or the output signal is passed. The data of the restriction table 111 is set by the user. The restriction table 111 is implemented by use of the memory 110. The restriction table 111 is an example of restriction storage means of the present disclosure.

In the example illustrated in FIG. 3, the operation at the time of input/output restriction is set to "OFF" for the "input point 1001" in the restriction table 111. This indicates that input of the signal to the "input point 1001" is blocked at the time of input/output restriction. For the "input point 1002", the operation at the time of input/output restriction is set to "ON" for the "input point 1002". This indicates that the input for the "input point 1002" is received even at the time of input/output restriction.

Upon receipt of a notification that a measured temperature in a unit among the input unit 200 and the output unit 300 exceeds a set threshold, the input/output manager 101 notifies that unit to perform an input/output restriction in accordance with setting content of the restriction table 111. The input/output manager 101 is implemented by use of the CPU 140.

Values indicating whether each of the input unit 200 and the output unit 300 is in a state of input/output restriction or a state of input/output non-restriction are set in the restriction state storage 112. In the restriction state storage 112, the value "1" is set as a value indicating that the input/output is in "restriction" or the value "0" is set as a value indicating that the input/output is in "non-restriction" for each of the input unit 200 and the output unit 300. The restriction state storage 112 is implemented by use of the memory 110.

The input unit 200 functionally includes a temperature detector 201 that detects a temperature in the unit, an input controller 202 that controls input from the detector 901, a threshold storage 211 that stores a threshold of a temperature that is a reference as to whether or not an input restriction is performed, an input setting 212 that stores content for setting passage/blockage of a signal in each input point, and a restriction state storage 213 that stores a value indicating a state of the input restriction.

The temperature detector 201 measures a temperature of at least one place in the input unit 200 at a determined timing, for example, every five minutes. The temperature detector 201 determines whether the measured temperature exceeds a threshold stored in the threshold storage 211, and when determination is made that the measurement value exceeds the threshold stored in the threshold storage 211, sends to the CPU unit 100 via the shared bus 410 a signal for notification of the determination result. The temperature detector 201 updates a parameter of the input setting 212 in accordance with the notification from the CPU unit 100. The temperature detector 201 is implemented by use of the temperature measurement circuit 230 and the MPU 250. The temperature detector 201 is an example of determination means, acquisition means, and notification means of the present disclosure.

The input controller 202 switches between passage/blockage of the input signal from the detector 901 in accordance with content of the setting in the input setting 212. The input controller 202 is implemented by use of the input circuit 240 and the MPU 250.

The threshold storage 211 is a reference value indicating whether to notify the CPU unit 100 of a temperature in the unit. The threshold storage 211 is an example of threshold storage means of the present disclosure.

The input setting 212 stores, for each input point, a parameter indicating whether the input signal is to be passed or blocked. The input setting 212 is updated upon issuance from the CPU unit 100 of an instruction of input/output restriction or an instruction to cancel the input/output restriction. The input setting 212 is implemented by the memory 210. The memory 210 is assumed to store a default value of the input setting 212 when the input/output restriction is not in progress.

For example, when the input setting 212 for a certain input point is set ON, the input controller 202 turns on the switching element for input of the input circuit 240 that is connected to the input point, and thus receives the input signal from the detector 901. When the input setting 212 for a certain input point is set to OFF, the input controller 202 turns off the switching element of input of the input circuit 240 that is connected to the input point, and thus blocks the input signal from the detector 901.

Values indicating the state of whether or not input/output restriction is in progress for the input unit 200 are set in the restriction state storage 213. In the restriction state storage 213, the value "1" is set as a value indicating that the input/output is in "restriction" or the value "0" is set as a value indicating that the input/output is in "non-restriction". The threshold storage 211, the input setting 212, and the restriction state storage 213 are implemented by use of the memory 210.

The output unit 300 functionally includes a temperature detector 301 that detects a temperature in the unit, an output controller 302 that controls output to the control target device 902, a threshold storage 311 that stores a threshold of a temperature that is a reference as to whether or not an output restriction is performed, an output setting 312 that stores content of a setting with respect to passage/blockage of a signal at each output point, and a restriction state storage 313 that stores a value indicating a state of the output restriction.

The temperature detector 301 measures a temperature of at least one place in the output unit 300 at a determining timing. The temperature detector 301 determines whether or not the measured temperature exceeds a threshold stored in the threshold storage 311, and when determination is made that the measurement value exceeds the threshold stored in the threshold storage 311, sends to the CPU unit 100 via the shared bus 410 a signal for notification of the determination result. The temperature detector 301 updates a parameter of the output setting 312 in accordance with the notification from the CPU unit 100. The temperature detector 301 is implemented by using the temperature measurement circuit 330 and the MPU 350. The temperature detector 301 is an example of the determination means, the acquisition means, and the notification means of the present disclosure.

The output controller 302 switches between passage/blockage of the output signal to the control target device 902 in accordance with content of the setting in the output setting 312. The output controller 302 is implemented by using the output circuit 340 and the MPU 350.

The threshold storage 311 is a reference value indicating whether to notify the CPU unit 100 of a temperature in the unit. The threshold storage 311 is an example of the threshold storage means of the present disclosure.

The output setting 312 stores a parameter indicating, for each output point, whether the output signal is to be passed or blocked. The output setting 312 is updated upon issuance, from the CPU unit 100 for each output point, of an instruction for input/output restriction or an instruction for unlocking of the input/output restriction. The output setting 312 is implemented by using the memory 310. The memory 310 is assumed to store a default value of the output setting 312 when the input/output restriction is not in progress.

For example, when an output point is set to ON in the output setting 312, the output controller 302 turns on the switching element for output of the output circuit 340 connected to that output point and outputs the output signal to the control target device 902. When the output setting 312 is set OFF for an output point, the output controller 302 turns off the switching element for output of the output circuit 340 that is connected to the output point, thereby blocking the output signal to the control target device 902.

Values indicating whether or not the input/output restriction is on are set in the restriction state storage 313. In the restriction state storage 313, the value "1" is set as a value indicating that the input/output is in "restriction" or the value "0" is set as a value indicating that the input/output is in "non-restriction". The threshold storage 311, the output setting 312, and the restriction state storage 313 are implemented by using the memory 310.

Next, a method for using the engineering tool 500 to set content of restriction with respect to the input/output is described. The user starts the setting application 512 by operating the inputter 520, such as a keyboard, a mouse, or the like. The CPU 550 executes the setting application 512 in response to a user's operation to achieve the following functions.

Figure 4A:
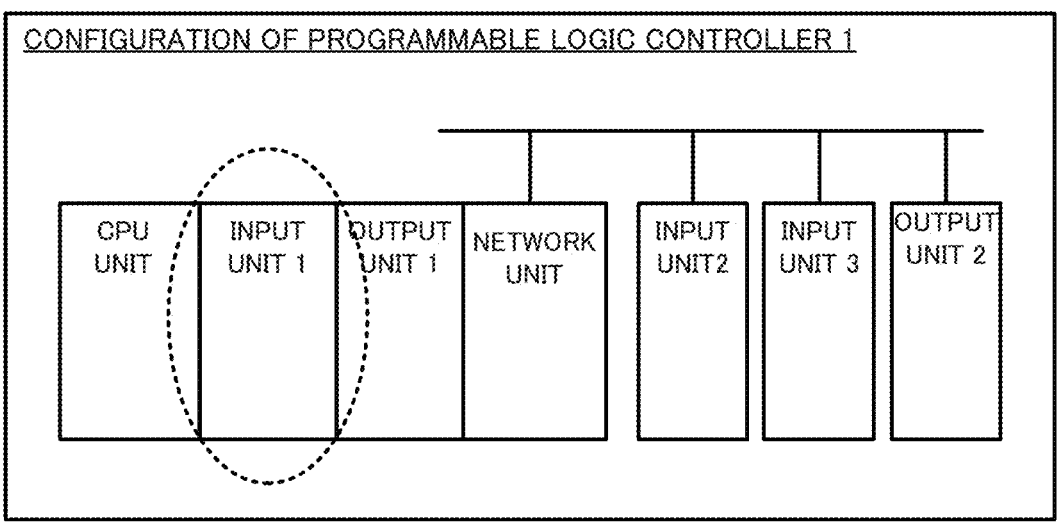
FIG. 4A is a diagram illustrating a screen showing a configuration of the programmable logic controller in the engineering tool according to the embodiment.
Figure 4B:
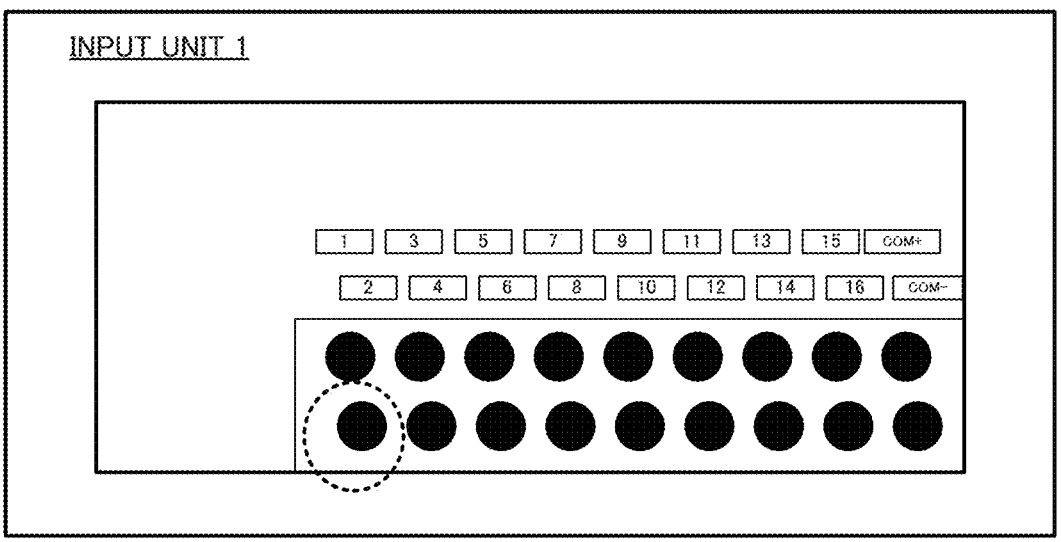
FIG. 4B is a diagram illustrating a selection screen of input/output points in the engineering tool according to the embodiment.
Figure 4C:
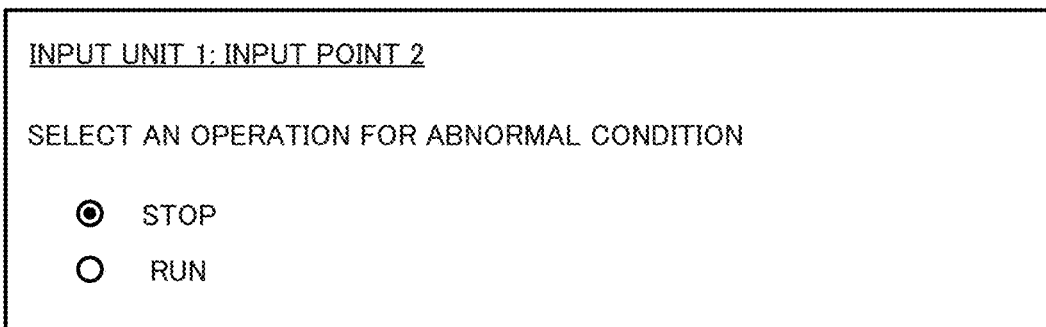
FIG. 4C is a diagram illustrating a setting screen of an operation of an input/output point in the engineering tool according to the embodiment.

First, the CPU 550 retrieves data relating to the configuration of the programmable logic controller 1 stored in the storage 510, and displays on the display 530 a screen indicating the configuration of the units of the programmable logic controller 1 as illustrated in FIG. 4A. The user selects, on the displayed screen as illustrated in FIG. 4A, the input unit 200 or the output unit 300 for which setting with respect to the input/output restriction is to be made, by operation of the inputter 520. For example, the user is assumed to select an "input unit 1". The CPU 550 retrieves from the storage 510 the data relating to the input/output point of the selected "input unit 1" in response to the user's operation so as to display the screen as illustrated in FIG. 4B on the display 530. Here, a screen for setting an operation during an input/output restriction for each input point of the "input unit 1" is displayed on the display 530. The user operates the input device of the inputter 520 to select an input point. For example, the user is assumed to select an "input point 2" enclosed by a dashed line. The CPU 550 retrieves the current set value from the restriction table 111 for the selected "input point 2" in response to the user's operation, and displays the screen as illustrated in FIG. 4C on the display 530. Here, a screen for setting of the input/output restriction of the "input point 2" of the "input unit 1" is displayed on the screen. The user operates the input device of the inputter 520 to select an operation. For example, the user is assumed to select "STOP". The CPU 550 responds to the user's operation and turns on or off the value of the operation that occurs during the input/output restriction of the restriction table 111 illustrated in FIG. 3.

Next, a sequential process flow relating to an input/output restriction performed cooperatively by the CPU unit 100, the input unit 200, and the output unit 300 is described. Before the start of the following process, the restriction state storage 112 of the CPU unit 100, the restriction state storage 213 of the input unit 200, and the restriction state storage 313 of the output unit 300 are assumed to be set to the value "0" indicating the "non-restriction" state.

As illustrated in FIG. 5, upon arrival of the time of temperature measurement (Yes in step S11), the temperature detector 201 of the input unit 200 measures a temperature (step S12) and stores the measurement value in the memory 210. When the value "0" indicating the "non-restriction" state is set to the restriction state storage 213, the temperature detector 201 determines that the state of non-restriction is in progress (Yes in step S13) and determines whether the measurement value exceeds a threshold of the threshold storage 211 (step S14). When determination is made that the measurement value exceeds the threshold of the threshold storage 211 (Yes in step S14), the temperature detector 201 sends to the CPU unit 100 notification relating to a monitoring temperature (step S15). Here, the temperature detector 201 may send notification that the measurement value exceeds the threshold of the threshold storage 211. The output unit 300 also performs the process illustrated in FIG. 5, similarly to the input unit 200. By contrast, when determination is made that the measurement value does not exceed the threshold of the threshold storage 211 (No in step S14), the temperature detector 201 performs processing of step S11 again without sending to the CPU unit 100 the notification relating to the monitoring temperature.

Figure 6A:
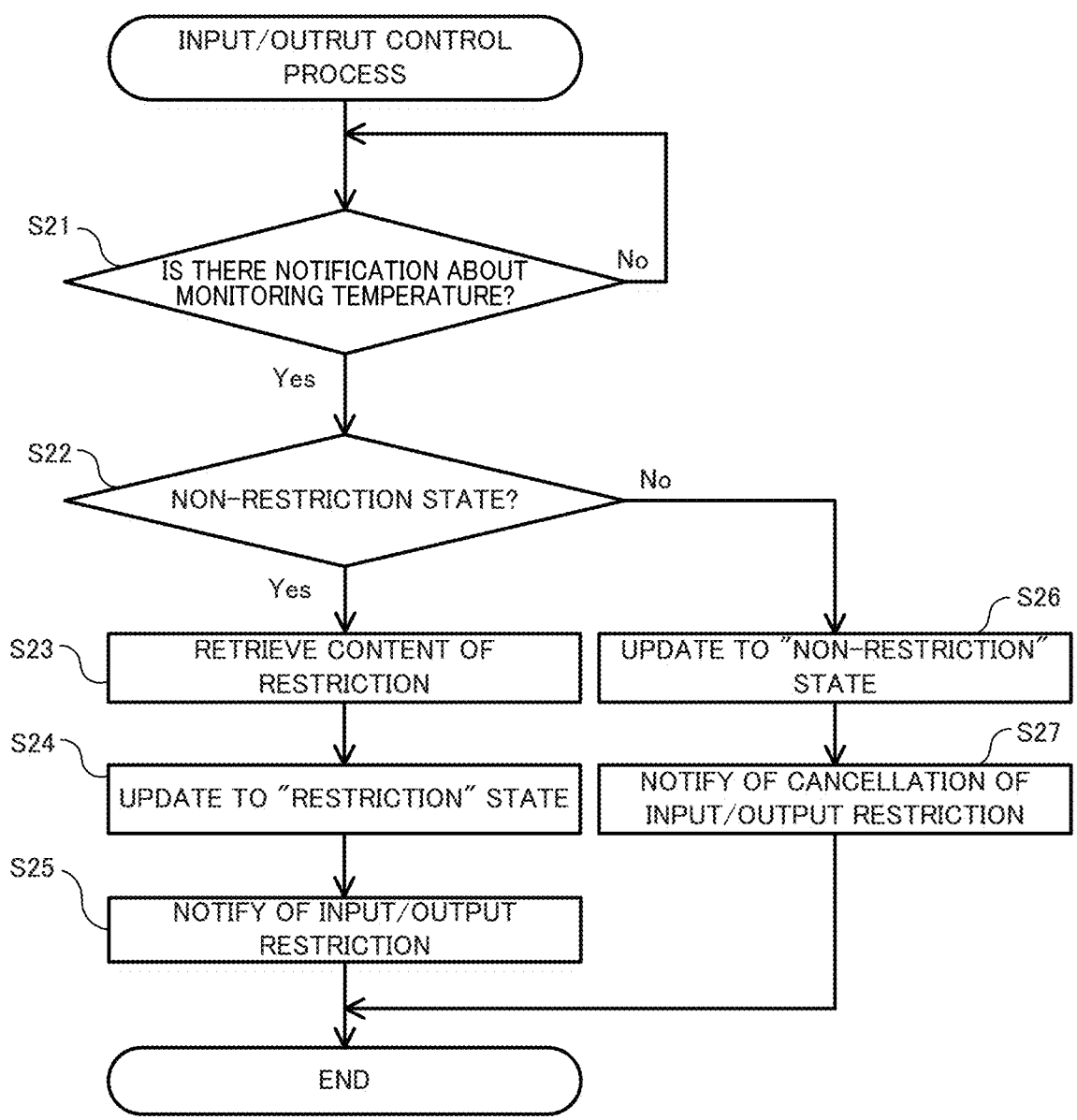
FIG. 6A is a flowchart of an input/output control process of a CPU unit according to the embodiment.

As illustrated in FIG. 6A, upon receiving from at least one of the input unit 200 or the output unit 300 the notification relating to the monitoring temperature (Yes in step S21), the input/output manager 101 of the CPU unit 100 determines, based on the value set to the restriction state storage 112, whether or not the non-restriction state is in progress (step S22). When the value "0" indicating the "non-restriction" state is set to the restriction state storage 112 (Yes in step S22), the input/output manager 101 retrieves content of restriction relating to the input/output from the restriction table 111 (step S23). For example, upon receipt of the notification relating to the monitoring temperature from the input unit 200, the input/output manager 101 retrieves, from the restriction table 111 for all the input points of the input units 200 that are to be target units, setting values of ON/OFF that occur during the input/output restriction. Here, the restriction state storage 112 is off, that is, the input/output restriction is not in progress for the input unit 200 or the output unit 300 that sends the notification relating to the monitoring temperature. This is because the notification relating to the monitoring temperature is sent from the input unit 200 or the output unit 300 since the temperature in the unit exceeds the threshold, and the unit having sent the notification relating to the monitoring temperature is to be subjected to the input/output restriction.

The input/output manager 101 updates the value of the restriction state storage 112 with the value "1" indicating that the "restriction" state is in progress (step S24), and sends an instruction to perform an input/output restriction to the transmission source of the notification relating to the monitoring temperature (step S25). At this time, the input/output manager 101 notifies the source of the notification relating to the monitoring temperature, about a parameter specifying ON/OFF of each input/output point during the input/output restriction and retrieved from the restriction table 111 in step S23. For example, when the notification relating to the monitoring temperature is received from the input unit 200, the input/output manager 101 sends to the input unit 200 a parameter relating to the input/output restriction having content of "input point1: OFF, input point 2: OFF, input point 3: OFF, input point 4: OFF, . . . , input point 15: ON, input point 16: OFF".

Figure 6B:
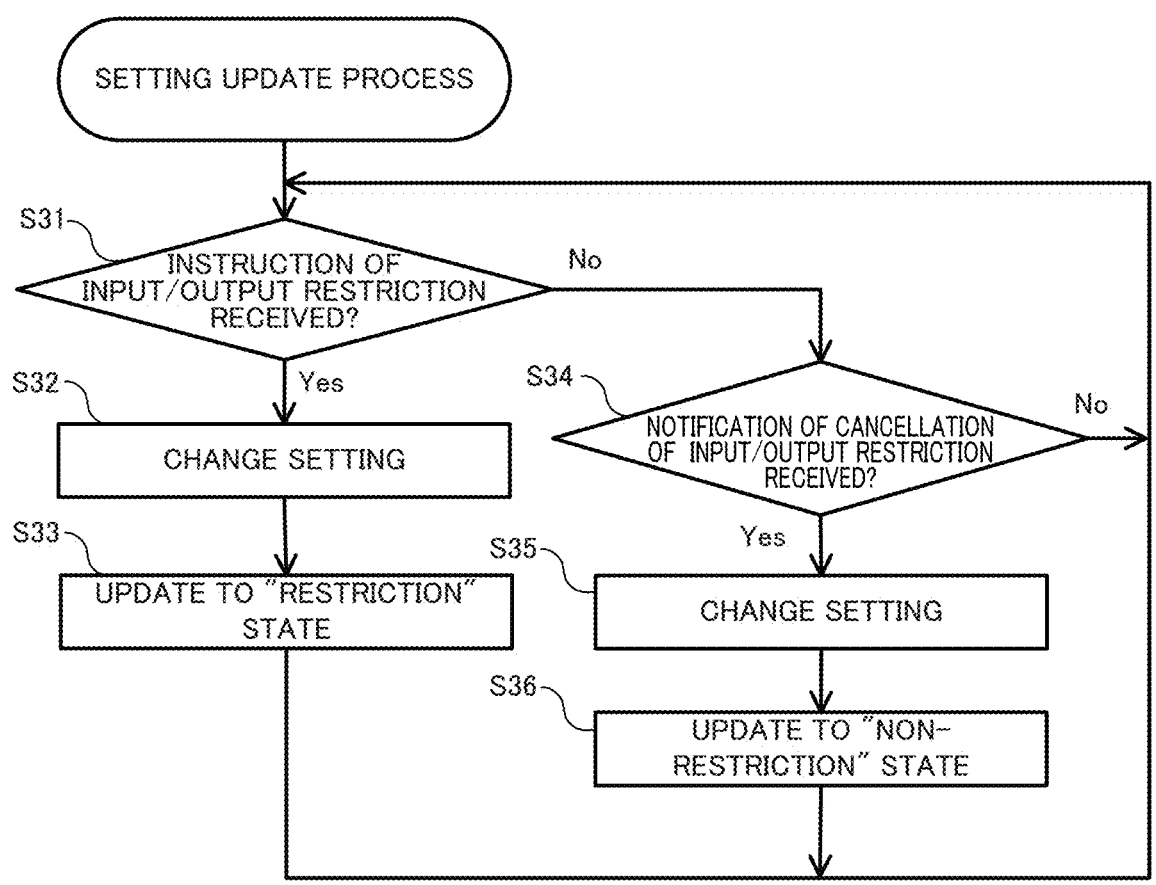
FIG. 6B is a flowchart of a setting update process of input and output units according to the embodiment.

As illustrated in FIG. 6B, upon receiving an instruction for the input/output restriction from the CPU unit 100 (Yes in step S31), the temperature detector 201 of the input unit 200 updates the value of the input setting 212 with a parameter relating to the input/output restriction received from the CPU unit 100 (step S32). Thereafter, the input controller 202 turns on or off the switching element for input of the input circuit 240 in accordance with the updated input setting 212. In addition, the temperature detector 201 sets the restriction state storage 213 to the value "1" indicating that the "restriction" state is in progress (step s33). The output unit 300 is assumed to perform a process illustrated in FIG. 6B, similarly to the input unit 200.

The input/output restriction is assumed to decrease a temperature in the unit that is the input unit 200 or the output unit 300. In this case, the CPU unit 100, the input unit 200, and the output unit 300 perform a process to cancel the input/output restriction. Before the start of the following process, the restriction state storage 112 of the CPU unit 100, the restriction state storage 213 of the input unit 200, and the restriction state storage 313 of the output unit 300 are assumed to be set to the value "0" indicating the "restriction" state.

As illustrated in FIG. 5, upon arrival of the time of temperature measurement (Yes in step S11), the temperature detector 201 of the input unit 200 measures a temperature (step S12) and stores the measurement value in the memory 210. The temperature detector 201 determines, based on the value set to the restriction state storage 213, whether the "non-restriction" state is in progress (step S13). When the value "1" indicating that the restriction state is in progress is set to the restriction state storage 213, the temperature detector 201 determines that the non-restriction state is in progress, that is, determines that the restriction state is in progress (No in step S13), and determines whether the measurement value is equal to or less than the threshold of the threshold storage 211 (step S16). When determination is made that the measurement value is equal to or less than the threshold of the threshold storage 211 (Yes in step S16), the temperature detector 201 sends to the CPU unit 100 the notification relating to the monitoring temperature (step S17). Here, the temperature detector 201 may send notification that the measurement value is equal to or less than the threshold of the threshold storage 211. The output unit 300 is assumed to perform a process illustrated in FIG. 5, similarly to the input unit 200. By contrast, when determination is made that the measurement value exceeds the threshold of the threshold storage 211 (No in step S16), the temperature detector 201 performs processing of step S11 again without sending to the CPU unit 100 the notification relating to the monitoring temperature.

As illustrated in FIG. 6A, upon receiving from at least one of the input unit 200 or the output unit 300 the notification relating to the monitoring temperature (Yes in step S21), the input/output manager 101 of the CPU unit 100 determines, based on the value set to the restriction state storage 112, whether or not the non-restriction state is in progress (step S22). When the value "1" indicating the restriction state is set in the restriction state storage 112, the input/output manager 101 determines that the restriction is in progress (No in step S22), and sets in the restriction state storage 112 the value "0" indicating the "non-restriction" state (step S26). Here, at the time of reception of the notification relating to the monitoring temperature, the value "1" is set in the restriction state storage 112. That is, the input/output is restricted in the input unit 200 or the output unit 300 to which the notification relating to the monitoring temperature is sent. This is because the notification relating to the monitoring temperature is sent from the input unit 200 or the output unit 300 since the temperature in the unit is equal to or less than the threshold, and the unit having sent the notification relating to the monitoring temperature is to be subjected to the input/output restriction.

The input/output manager 101 sends an instruction to cancel the input/output restriction to the source of the notification relating to the monitoring temperature (step S27).

As illustrated in FIG. 6B, upon not receiving the notification of the input/output restriction (No in step S31) and receiving the notification to cancel the input/output restriction (Yes in step S34) from the CPU unit 100, the temperature detector 201 of the input unit 200 updates the value of the input setting 212 with a default value stored in the memory 210 (step S35). Thereafter, the input controller 202 turns on or off the switching element for input of the input circuit 240 in accordance with the updated input setting 212. In addition, the input controller 202 sets the restriction state storage 213 to the value indicating a "non-restriction" state (step S36). The output unit 300 is assumed to perform a process illustrated in FIG. 6B, similarly to the input unit 200.

As described above, when the temperature in the unit of the input unit 200 or the output unit 300 exceeds the threshold, the programmable logic controller 1 according to the embodiment does not restrict the input/output for the input/output point specified in the unit.

Such configuration can achieve a continuous operation for the input/output that is not to be restricted, while preventing failure of the input unit 200 and the output unit 300. For example, an input signal from an emergency stop of a device or an input signal from an air curtain can be set so that supply of the input signal to the CPU unit 100 is not stopped.

Furthermore, the temperature in the unit is monitored, and when the temperature in the unit is equal to or less than the threshold, the input/output restriction is canceled. Thus continuation of unnecessary input/output restriction can be prevented.

Modified Example 1

Figure 7A:
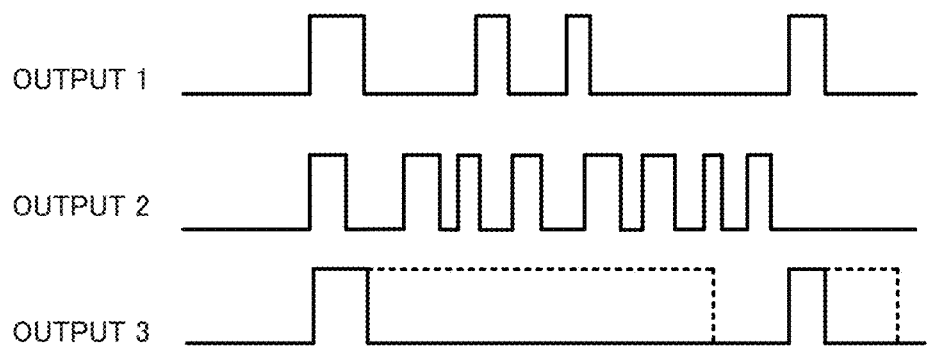
FIG. 7A is a timing chart of an output signal for describing an example of a method for input/output restriction by an input/output manager according to Modified Example 1.

In the embodiment, the input/output manager 101 performs control to turn off all the input/output points set to be OFF in the restriction table 111. But the present disclosure is not limited to such a configuration. For example, the input/output manager 101 may control the input/output point that is set OFF to have a shortened output period. In the example illustrated in FIG. 7A for the output point 3, although the input/output manger 101 prior to restriction continuously outputs an output signal during a period represented by dashed lines. During restriction, the input/output manager 101 does not output an output signal during a period represented by dashed lines and outputs the output signal only during the period represented by a solid line. Such operation shortens the period for output of the output signal.

Figure 7B:
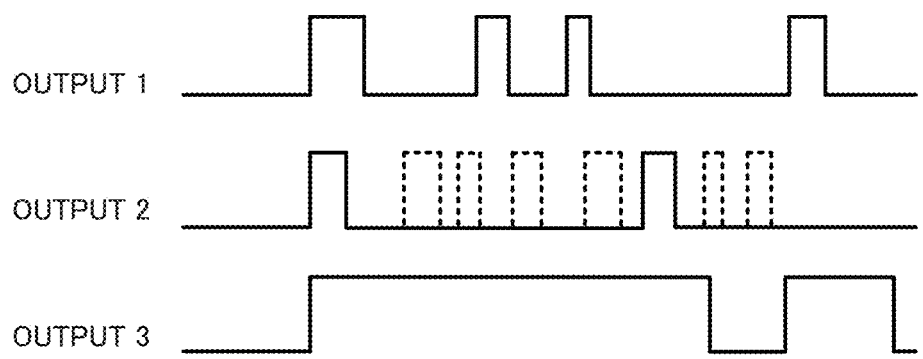
FIG. 7B is a timing chart of an output signal for description of another example of a method for input/output restriction by the input/output manager according to Modified Example 1.

Alternatively, the input/output manager 101 may control the input/output number of times of the input/output point set to be OFF to be decreased. In the example illustrated in FIG. 7B, before the restriction, the input/output manger 101 continuously outputs an output signal represented by dashed lines for the output point 2. However, during restriction, the input/output manager 101 does not output an output signal represented by dashed lines and outputs only the output signal represented by dashed lines. In this way, the number of times of outputting the output signal decreases.

Modified Example 2

In the above embodiment, each input/output point in the restriction table 111 is set ON or OFF during the input/output restriction and the input/output manager 101 turns off all the input/output points set OFF in the restriction table 111. However, there is a case where the specified input/output points do not have to be OFF, depending on a degree of an increase in temperature in the unit. Thus the input/output manager 101 may control ON/OFF of the input/output points as follows.

Figure 8:
FIG. 8 is a diagram illustrating an example of data registered in a restriction table according to Modified Example 2.

FIG. 8 illustrates an example of data registered in a restriction table 111a according to Modified Example 2. The restriction table 111a includes setting of a priority level indicating an order of priority for each of the input/output points. Here, any one of the values "level 1", "level 2", and "level 3" is set as the priority level. The "level 3" indicates the input/output point that is restricted first during the input/output restriction. The "level 2" indicates the input/output point for which restriction comes next after a level 3 during the input/output restriction. The "level 1" indicates the input/output point that is not restricted, that is, not turned off during the input/output restriction. In Modified Example 2, the order of setting OFF increases with magnitude of the level value.

In Modified Example 2, two thresholds are set that indicating a reference as to whether restriction is performed based on the measured temperature. The reference temperature for restriction of the level 3 input/output points is set as a first threshold. The reference temperature for restriction of the level 2 input/output points is set as a second threshold. The temperature specified as a second threshold is higher than the temperature specified as the first threshold.

Figure 9:
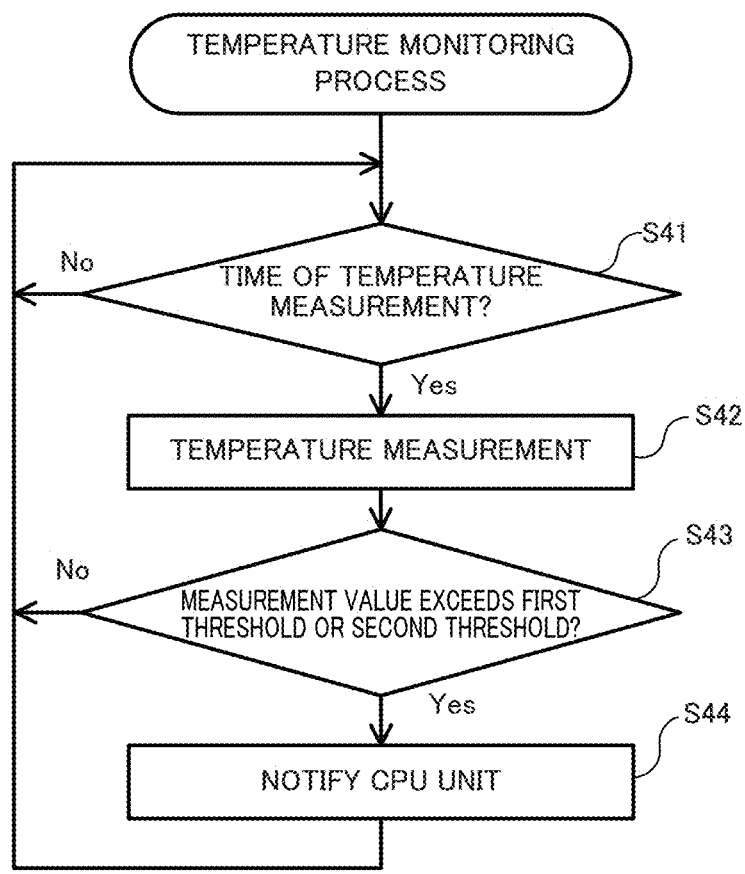
FIG. 9 is a flowchart of a temperature monitoring process according to Modified Example 2.

In this case, as illustrated in FIG. 9, upon arrival of the time of temperature measurement (Yes in step S41), the temperature detector 201 of the input unit 200 measures a temperature (step S42), and determines whether the measurement value exceeds the second first threshold or the second threshold (step S43). When determination is made that the measurement value exceeds the first threshold or the second threshold (Yes in step S43), the temperature detector 201 notifies the CPU unit 100 that the measurement value exceeds the first threshold or the second threshold (step S44). By contrast, the temperature detector 201 performs processing step S41 again when determination is made that the measurement value does not exceed the first threshold or the second threshold (No in step S43).

By contrast, when determination is made that the measurement value does not exceed the first threshold or the second threshold in step S43 (No in step S43), the temperature detector 201 performs processing of step S41 again. The output unit 300 also performs processing of the flow illustrated in FIG. 9, similarly to the input unit 200.

Figure 10:
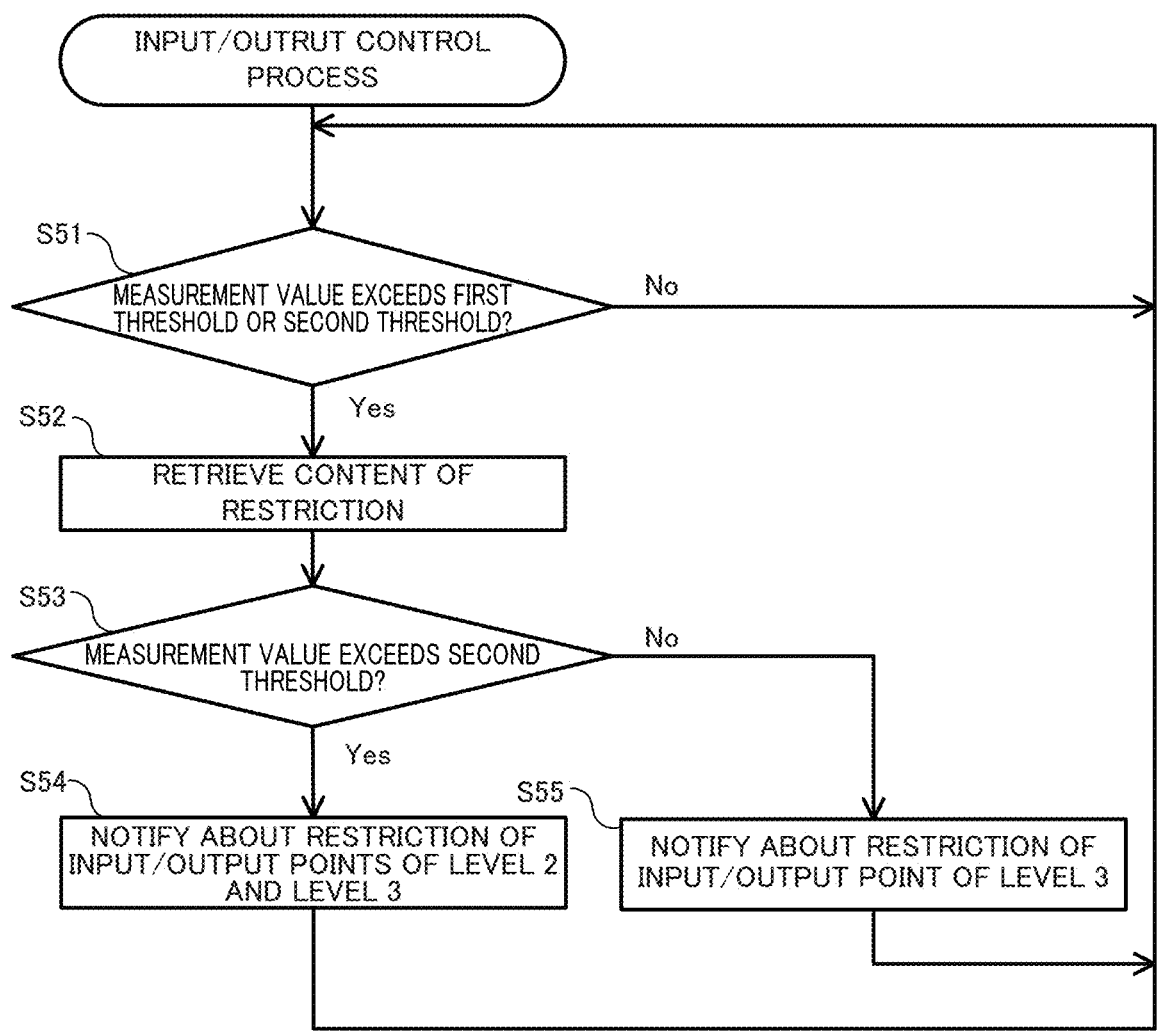
FIG. 10 is a flowchart of an input/output control process according to Modified Example 2.

As illustrated in FIG. 10, when determination is made that the measurement value of the temperature in the unit exceeds the first threshold or the measurement value of the temperature in the unit exceeds the second threshold based on the notification relating to the received monitoring temperature from at least one of the input unit 200 or the output unit 300 (Yes in step S51), the input/output manager 101 of the CPU unit 100 retrieves content of restriction relating to the input/output from the restriction table 111a (step S52). For example, upon receiving the notification relating to the monitoring temperature from the input unit 200, the input/output manager 101 retrieves, from the restriction table 111a, setting values of ON/OFF during the input/output restriction for all the input points of the input units 200 serving as the target units.

The input/output manager 101 determines, based on the notification from the input unit 200 or the output unit 300, whether the measurement value exceeds the second threshold (step S53). When determination is made that the measurement value exceeds the second threshold (Yes in step S53), the input/output manager 101 notifies the source of the measurement value to restrict the input/output points with priority levels set to "level 2" and "level 3" in the restriction table 111a illustrated in FIG. 8 (step S54). By contrast, as illustrated in FIG. 10, when determination is made the measurement value does not exceed the second threshold, that is, the measurement value exceeds the first threshold in step S53 (No in step S53), the input/output manager 101 notifies the source of the measurement value to restrict the input/output points with the priority levels set to "level 3" in the restriction table 111a illustrated in FIG. 8 (step S55). This is because in this case the measurement value does not exceed the second threshold but exceeds the first threshold.

As described above, in Modified Example 2, the input/output restriction can be performed stepwise in accordance with a degree of an increase in temperature in the unit.

Modified Example 3

In the embodiment and Modified Examples 1 and 2, the examples in which a user sets ON/OFF, priority levels and the like for all the input/output points are described. However, in a case where there are too many input/output points, setting ON/OFF, priority levels, and the like in the restriction table 111 for all the input/output points by the user is sometimes difficult.

In Modified Example 3, the CPU unit 100 automatically selects an input/output point for turning OFF. The user needs to previously set in the restriction table 111 an input/output point for which a continuous operation is needed, that is, an input/output point that is not to be turned OFF, using the engineering tool 500 similarly to the embodiment.

A method for setting a parameter of the restriction table 111 by the CPU unit 100 is described below. The input unit 200 is assumed to send, at certain time intervals, data indicating a history of the input period and a number of times of occurrence of the input signal to the CPU unit 100. The same applies to the output unit 300.

Figure 11:
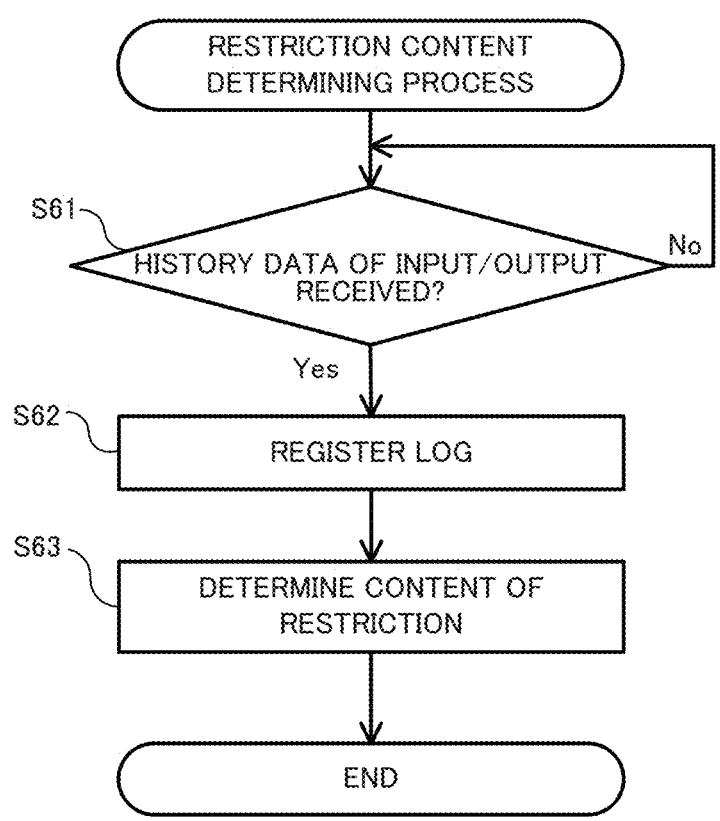
FIG. 11 is a flowchart of a restriction control content determination process according to Modified Example 3.

As illustrated in FIG. 11, upon receiving from at least one of the input unit 200 or the output unit 300 data relating to a history of the input/output signals in the input unit 200 or the output unit 300 (Yes in step S61), the input/output manager 101 of the CPU unit 100 registers the received data as a log (step S62).

The input/output manager 101 determines the content of restriction based on the log and the restriction table 111 (step S63). Specifically, the input/output manager 101 retrieves the content of restriction relating to the input/output from the restriction table 111. As described above, in Modified Example 3, the input/output point that is to be continuously ON during the input/output restriction is specified in the restriction table 111. Thus the input/output manager 101 determines from the log a total amount of time obtained by a sum of lengths of the input/output time in a certain period of time, for each of the input/output points other than the input points previously set by a user to the restriction table 111 so as to continuously be ON, and restricts as a restriction target the input/output points whose total amount of time exceeds a reference value. The input/output manager 101 updates the restriction table 111 with the determined content of restriction.

Such a configuration enables automatic setting of the content of the input/output restriction for the input/output point specified by the user without turning the input/output point OFF. This can prevent failure of the input unit 200 and the output unit 300. Thus the input/output that is not to be restricted can achieve continuous operation while failure of the input/output unit is prevented.

Alternatively, the input/output manager 101 may select as a restriction target the N input points (N is an integer) of the input points having the greatest total amounts of time.

Modified Example 4

In the embodiment and Modified Examples 1 to 3, determination as to whether or not the temperature in the input unit 200 exceeds the threshold of the threshold storage 211 is made in the input unit 200 and determination as to whether the temperature in the output unit 300 exceeds the threshold of the threshold storage 311 is made in the output unit 300, but the present disclosure is not limited to such configuration. The input unit 200 and the output unit 300 may simply send the measurement value of the temperature in the unit to the CPU unit 100.

In this case, the threshold of the input unit 200 and the threshold of the output unit 300 are previously stored in the memory 110 of the CPU unit 100. Determination by the input/output manager 101 of the CPU unit 100 as to whether the measurement value received from the input unit 200 exceeds the threshold of the input unit 200 is sufficient. When determination is made that the temperature in the input unit exceeds the threshold of the input unit, the input/output manager 101 instructs the input unit 200 to perform an input/output restriction. The same applies to the output unit 300. In this case, the input/output manager 101 is an example of determination means of the present disclosure.

For cancellation of the input/output restriction, in the embodiment and Modified Examples 1 to 3, determination as to that the temperature in the input unit 200 is equal to or less than the threshold of the threshold storage 211 is made in the input unit 200, and determination as to whether the temperature in the output unit 300 is equal to or less than the threshold of the threshold storage 311 is made in the output unit 300, but the present disclosure is not limited to such configuration. The input unit 200 and the output unit 300 may simply send the measurement value of the temperature in the unit to the CPU unit 100.

Determination by the input/output manager 101 of the CPU unit 100 as to whether the temperature in the input unit 200 is equal to or less than the threshold of the input unit 200 is sufficient. When determination is made that the temperature in the input unit 200 is equal to or less than the threshold of the input unit 200, the input/output manager 101 instructs the input unit 200 to cancel the input/output restriction. The same applies to the output unit 300.

The embodiment and Modified Examples 1 to 4 describe an example of performing the input/output restriction of the input unit 200 and the output unit 300 that are function units different from the CPU unit 100, but the present invention is not limited to such configuration. For example, the CPU unit 100 itself may have at least one function of the input function or the output function. In this case, the CPU unit 100 may control passage/blockage of a signal supplied from the detector 901 connected to the CPU unit 100 and a signal to be supplied to the control target device 902.

Alternatively, the input unit 200 itself that is a function unit may perform an input restriction. Specifically, the input unit 200 is designed to include a restriction table 111, and the input unit 200 performs control of passage/blockage of the signal supplied from the detector 901 in accordance with the control content set in the restriction table 111 based on the measured temperature. Similarly, the output unit 300 itself may perform the output restriction.

In the above embodiment, an example of monitoring the temperatures in the units that are the input unit 200 and the output unit 300 is described, but the present disclosure is not limited to such configuration. For example, a temperature sensor may be mounted on an enclosure of the unit, and the input/output restriction may be performed based on the measurement value of the temperature sensor. Alternatively, a temperature sensor may be provided near the unit, and the input/output restriction may be performed based on the temperature around the unit.

As a recording medium for recording the above programs, a universal serial bus (USB) memory, a flexible disc, a compact disc (CD), a digital versatile disc (DVD), Blu-ray (registered trademark), a magneto-optical disc (MO), a secure digital (SD) card, Memory Stick (registered trademark), or a computer-readable recording medium including a magnetic disk, an optical disk, a magneto-optical disk, a semiconductor memory, and a magnetic tape can be used.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

REFERENCE SIGNS LIST

1 Programmable logic controller
100 CPU unit
210, 310, 510 Storage
101 Input/output manager
110, 210, 310 Memory
111, 111a Restriction table
112, 213, 313 Restriction state storage
120, 220, 320 Input/output I/F circuit
130 Tool I/F circuit
140, 550 CPU
190, 290, 390, 590 Bus
200 Inputter
201, 301 Temperature detector
202 Input controller
211, 311 Threshold storage
212 Input setting
230, 330 Temperature measurement circuit
240 Input circuit
250, 350 MPU
300 Output unit
302 Output controller
340 Output circuit
310 Storage device
312 Output setting
400 Base unit
410 Shared bus
500 Engineering tool
501 Communication cable
511 Operating system program
512 Setting application
520 Inputter
530 Display
540 Tool interface
901 Detector
902 Control target device
1001, 1002 Input point

The invention claimed is:

1. A programmable logic controller comprising:
circuitry configured to implement
a central processing unit (CPU) unit;
a function unit having at least one of an input function of inputting to the CPU unit a signal supplied from an external device or an output function of outputting to the external device a signal supplied from the CPU unit;
an acquirer to acquire a temperature of the function unit;
a controller to control, when the temperature of the function unit satisfies a preset condition, passage and blockage of the signal from the external device to the function unit or the signal from the function unit to the external device, in accordance with preset content of signal input/output restriction; and
a restriction storage to store, for each source of the signal as the content of the restriction, information indicating whether or not restriction to shorten a period of time to pass the signal is imposed when the temperature of the function unit is higher than a specified threshold, wherein
when the temperature of the function unit is higher than the threshold, the controller shortens time to pass the signal specified in the restriction storage to be shorter than that when the temperature of the function unit is not higher than the threshold.

2. The programmable logic controller according to claim 1, wherein when the temperature of the function unit is equal to or lower than the threshold after exceeding the threshold, the controller extends time to pass the signal specified in the restriction storage to be longer than that when the temperature of the function unit is higher than the threshold.

3. The programmable logic controller according to claim 1, wherein when the temperature of the function unit is higher than the threshold, the controller increases the number of times of blocking the signal specified in the restriction storage so as to be more than that when the temperature of the function unit is not higher than the threshold.

4. The programmable logic controller according to claim 3, wherein when the temperature of the function unit is equal to or lower than the threshold after exceeding the threshold, the controller increases the number of times of passing the signal specified in the restriction storage so as to be more than that when the temperature of the function unit is higher than the threshold.

5. The programmable logic controller according to claim , wherein
the restriction storage further stores a signal blocking order for each signal, and
when the temperature of the function unit is higher than the threshold, the controller blocks the signal sequentially in accordance with the signal blocking order stored in the restriction storage.

6. The programmable logic controller according to claim 1, wherein when a period that is a total amount of periods of signal supply from the external device to the function unit is longer than a reference value in a certain period, the controller extends time to block the signal to be longer than that when the total amount of periods is not longer than the reference value.

7. The programmable logic controller according to claim 1, wherein
the circuitry is configured to implement the function unit such that the function unit comprises
a threshold storage to store the threshold,
a determiner to determine whether the temperature in the function unit is higher than a preset threshold, and
a notifier to notify the CPU unit that the temperature in the function unit is higher than the threshold.

8. The programmable logic controller according to claim 1, wherein
the circuitry is configured to implement the function unit such that the function unit comprises
a notifier to notify the CPU unit of the temperature inside the function unit, and
the CPU unit comprises
a threshold storage to store the threshold, and
a determiner to determine whether the temperature inside the function unit is higher than a preset threshold.

9. A central processing unit (CPU) unit having at least one of an input function of receiving a signal supplied from an external device or an output function of outputting a signal to the external device, the CPU unit comprising:
circuitry configured to implement
an acquirer to acquire a temperature of the CPU unit;
a controller to control, when the temperature of the CPU unit satisfies a preset condition, passage and blockage of the signal in accordance with preset content of restriction for each of input/output points; and
a restriction storage to store, for each source of the signal as the content of the restriction, information indicating whether or not restriction to shorten a period of time to pass the signal is imposed when the temperature of the CPU unit is higher than a specified threshold, wherein when the temperature of the CPU unit is higher than the threshold, the controller shortens a period of time to pass the signal specified in the restriction storage to he shorter than that of when the temperature of the CPU unit is not higher than the threshold.

10. A function unit, comprising circuitry configured to implement the function unit having an input function of inputting to a central processing unit (CPU) unit a signal supplied from an external device and an output function of outputting to the external device a signal supplied from the CPU unit, the circuitry being configured such that the function unit comprises:

an acquirer to acquire a temperature of the function unit;

a controller to control, when the temperature of the function unit satisfies a preset condition, passage and blockage of the signal in accordance with preset content of restriction for each of input/output points; and a restriction storage to store, for each source of the signal as the content of the restriction, information indicating whether or not restriction to shorten a period of time to pass the signal is imposed when the temperature of the function unit is higher than a specified threshold, wherein when the temperature of the function unit is higher than the threshold, the controller shortens a period of time to pass the signal specified in the restriction storage to be shorter than that of when the temperature of the function unit is not higher than the threshold.

* * * * *